Patented Nov. 9, 1943

2,333,903

UNITED STATES PATENT OFFICE 2,333,903

TREATMENT OF HYDROCARBONS

Charles L. Thomas and Herman S. Bloch, Chicago, Ill., assignors to Universal Oil Products Company, Chicago, Ill., a corporation of Delaware No Drawing. Application June 5, 1939,
Serial No. 277,458

14 Claims. (Cl. 260—666)

This invention relates particularly to the treatment of cyclo-olefins containing 6-membered rings, or hydrocarbon mixtures containing such cyclo-olefins, to transform them into more highly branched 5-membered olefinic ring compounds. More specifically the invention comprises the novel process for accomplishing these isomerization reactions employing particular catalysts and conditions of operation.

In one specific embodiment the present invention comprises a process for contacting cyclohexene derivatives with a synthetically prepared composite of silica and an oxide selected from the group consisting of alumina and zirconia at a temperature in the approximate range of 200–450° C. whereby to isomerize said cyclohexene derivatives into more highly branched cyclopentene derivatives. In a further embodiment the catalytic material comprises synthetically prepared silica and alumina composited with an oxide selected from the group consisting of zirconia and thoria.

For purposes of reference, the names, normal boiling points, densities, and refractive indices are given below for cyclohexene, the simplest cyclo-olefin containing a 6-membered ring, and for the isomeric hydrocarbons containing 5-membered rings.

| Name | Normal boiling point | Density @ 20° C. | Refractive index |
| --- | --- | --- | --- |
| | °C. | | |
| Cyclohexene | 82 | 0.810 | 1.4464 |
| 1-methylcyclopentene-1 | 74 | .775 | 1.4347 |
| 1-methylcyclopentene-2 | 66 | .766 | 1.4222 |
| 1-methylcyclopentene-3 | 75 | .772 | 1.4346 |
| Methylenecyclopentane | 80 | .780 | 1.4355 |

By the process of this invention other cyclohexene derivatives, this term herein meaning cyclohexene and alkylated cyclohexenes, isomerize into more highly alkylated or more highly branched 5-membered olefinic rings. Such more highly branched cyclo-olefins may be utilized in various ways to produce desired materials. Thus methylcyclopentenes may be used in the alkylation of isobutane in the presence of suitable catalysts to produce hydrocarbons of higher octane number than are generally obtainable by alkylating with a cyclohexene derivative having the same number of carbon atoms as contained in the cyclopentene utilized. Alkyl cyclopentenes are also useful as intermediates in the preparation of solvents, such as the corresponding alcohols, ethers, esters, etc. Cyclic alcohols are formed from cyclopentenes by hydration reactions in the presence of suitable catalysts and from such cyclic alcohols, ethers and esters may be prepared by a number of methods.

In the following specification the terms "silica-alumina, silica-zirconia, silica-alumina-thoria, and silica-alumina-zirconia" masses are used in a broad sense. Inasmuch as the chemical knowledge of the solid state has not been developed perfectly, it is not possible to give the structure of all solid substances. All that can be said definitely concerning these masses is that they contain silica, alumina, and zirconia or thoria in some combination or combinations. We specifically describe the catalytic masses used in the process of this invention and arbitrarily refer to them as indicated above for lack of a more precise term.

According to the process of the present invention, cyclo-olefins containing 6-membered rings are isomerized to a substantial degree into more highly branched 5-membered cyclo-olefins by contact at 200–450° C. under substantially atmospheric pressure with synthetically prepared composite masses of silica with alumina or zirconia, and also of silica and alumina with zirconia or thoria.

The preferred isomerization catalysts may be prepared by a number of alternative methods which have certain necessary features in common, as will subsequently be described. Generally speaking, however, the catalysts may be considered to comprise intimate molecular combinations of silica with alumina, zirconia, and/or thoria, all of which components possess more or less low activity individually but display high activity in the aggregates. The activity is not an additive function, it being relatively constant for a wide range of proportions of the components whether in molecular proportions or fractions of molecular proportions. No one component may be determined as the one component for which the remaining components may be considered as the promoters according to conventional terminology, nor can any component be definitely fixed as the support and the others as the catalyst proper.

According to one general method of preparation the preferred isomerization catalysts may be prepared by precipitating silica from solution as a hydrogel and subsequently admixing or depositing the hydrogels of alumina, zirconia, and/or thoria upon the hydrated silica. One of the more convenient methods of preparing the silica hydrogel is to acidify an aqueous solution of sodium silicate by the addition of an acid, such as hydrochloric acid, for example. The excess acid and the concentration of the solution in which the precipitation is brought about determine in some measure the suitability of the silica hydrogel for subsequent deposition of the hydrogels of alumina, zirconia, and/or thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica hydrogel, it is treated and washed to remove substantially all alkali metal ions. It is not known whether the alkali metal ions, such as sodium ions, are present in the primary gel in chemical combination, or in an adsorbed state but it has been determined definitely that their removal is necessary if catalysts are to be obtained suitable for prolonged use in accelerating hydrocarbon conversion reactions of the present character. It is possible that the presence of the alkali metal impurities causes a sintering or fluxing of the surfaces of the catalyst at elevated temperatures of the order of those used in the process so that the porosity is much reduced with corresponding reduction in effective surface. Alkali metal ions may be removed by treating with solutions of acidic materials, ammonium salts, or salts of aluminum, zirconium, and/or thorium. When treating with acids, as for example with hydrochloric acid, the acid extracts the alkali metal impurities in the silica gel. Then the acid and the salts formed are removed substantially by water washing treatment. Where ammonium salts, or salts of aluminum, zirconium, and/or thorium are used, the ammonium or multivalent metals used apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas in the treatment with ammonium salts, small amounts of the ammonium salts remaining after the washing process will be driven off in subsequent treatment at elevated temperatures.

In one of the preferred methods of compositing the hydrogel materials, the purified precipitated hydrated silica gel may be suspended in a solution of aluminum, zirconium, and/or thorium salts in the desired proportion and the alumina, zirconia, and/or thoria hydrogel deposited within and/or upon the suspended silica hydrogel by the addition of volatile basic precipitants, such as ammonium hydroxide, ammonium carbonate, ammonium hydrosulfide, ammonium sulfide, or other volatile basic precipitants, such as organic bases may be employed. According to this method, the purified silica gel may be suspended in a solution of aluminum chloride, zirconyl nitrate, and/or thorium nitrate, for example, and the hydrated alumina, zirconia, and/or thoria precipitated by the addition of ammonium hydroxide. In this example, the alumina, zirconia, and/or thoria are co-precipitated.

Alternatively the purified silica gel may be mixed while in the wet condition with separately prepared hydrated alumina, hydrated zirconia, and/or hydrated thoria precipitated either separately or concurrently, as for example by the addition of volatile basic precipitants to solutions of aluminum, zirconium, and/or thorium salts. The hydrated alumina, hydrated zirconia, and/or hydrated thoria thus prepared are substantially free from alkali metal ions and can be mixed with purified silica gel. However, if alkali metal ions are incorporated as when the hydrated alumina is prepared from sodium aluminate, for example, or if zirconium and/or thorium tetrahydroxides are precipitated by the interaction of zirconyl nitrate and/or thorium nitrate and sodium hydroxide, regulated purification treatment and water washing, by methods selected from those described in connection with the purification of hydrated silica gel to remove alkali metal ions will be required. Care should be observed in the selection and concentration of reagents used so as not to dissolve unduly large amounts of alumina, zirconia, and/or thoria.

As further alternatives, purified silica gel may be added to a solution of salts of aluminum, zirconium, and/or thorium and hydrated alumina, hydrated zirconia, and/or hydrated thoria deposited by hydrolysis with or without the use of heat, or the purified silica gel may be mixed with suitable amounts of salts of aluminum, zirconium, and/or thorium as, for example, in forming a paste and heating whereby alumina, zirconia, and/or thoria are deposited upon the silica gel as a result of the decomposition of the aluminum, zirconium, and/or thorium salts.

In the methods above described, a silical hydrogel free from alkali metal ions was admixed or had deposited thereon relatively pure hydrated alumina, hydrated zirconia, and/or hydrated thoria prior to the drying treatment. In methods described below, the hydrated silica with a hydrated alumina, hydrated zirconia, and/or hydrated thoria are concurrently precipitated or admixed and treated to remove the alkali metal ions from the composited material prior to drying treatment, either in the presence of the original reactants or subsequent to water washing. Thus, solutions of silicon compounds, more usually alkali metal silicates and soluble aluminum, zirconium, and/or thorium salts may be mixed under regulated conditions of acidity or basicity to jointly precipitate hydrated silica, hydrated alumina, hydrated zirconia, and/or hydrated thoria in varying proportions. For example, solutions of sodium silicate, aluminum chloride, zirconyl nitrate, and/or thorium nitrate may be mixed and an alkaline or acid reagent added according to the proportions used so that a pH in the range of 3–10 is obtained. In cases where a sol is formed, the precipitation may be brought about if the sol is acid by the addition of a volatile base, as for example, ammonium hydroxide, and alkali metal salts removed by water washing, or the composite may be treated as indicated above in connection with the purification of the hydrated silica to remove alkali metal ions. Various methods are possible for the preparation of the hydrated silica, hydrated alumina, hydrated zirconia, and/or hydrated thoria separately or in combination and the purifying treatment is necessary where alkali metal ions are present in substantial amounts.

The character and efficiency of the ultimately prepared silica catalyst supports will vary more or less with methods of precipitation and/or mixing, purification treatment, ratio of components, calcining, etc., a specific example being given below. The ratio of the components may be varied within wide limits, the limiting factor being more in evidence with respect to small proportions than with large proportions of the various components. In general, it appears that 2–6 mole per cent of alumina, zirconia, and/or thoria, together with reference to silica may be considered an approximation of the minimum proportions. Because zirconium and thorium are relatively expensive, it is generally desirable to use the minimum effective proportions of them.

After the alumina, zirconia, and/or thoria gels have been mixed with or deposited on the purified silica gel and water washed, if desired, as described for one general method of preparation, or after the hydrated silica, hydrated alumina, hydrated zirconia, and/or hydrated thoria have been composited and treated to remove the alkali metal ions, as described for another general method of preparation, the catalytic materials may be recovered as a filter cake and dried at a temperature in the order of 240–300° F., more or less, after which it may be formed into particles of a suitable average definite size ranging from powder to various forms and sizes obtained by pressing and screening, or otherwise formed into desirable shapes by compression or extrusion methods.

By calcining at temperatures of the order of approximately 850–1000° F., or higher, the maximum activity of the catalyst is obtained and a further dehydration occurs so that, for example, after a considerable period of heating at 900° F., the water content, as determined by analysis, is of the order of 2–3%.

Isomerizing catalysts prepared by the various types of procedures outlined above evidently possess large total contact surfaces corresponding to a desirable porosity, the pores of the catalyst particles being of such size and shape that they do not become clogged with carbonaceous deposit after a long period of service and are, therefore, not difficult to reactivate by oxidation. This structure is retained, also, after many alternate periods of use and reactivation, as evidenced by the fact that the catalyst may be reactivated rapidly by passing air or other oxidizing gas over the used particles to burn off the deposits of carbonaceous materials at temperatures above 800° F., temperatures as high as 1400–1600° F., having been reached without apparently affecting the catalytic activity.

In practicing the isomerization of 6-membered cyclo-olefins to produce substantial yields of more branched 5-membered cyclo-olefins according to the present process, a solid composite catalyst mixture prepared according to the foregoing alternative methods is used as a filler in a reaction tube or chamber in the form of particles of graded size or small pellets and the cyclohexene derivative to be isomerized is passed therethrough while at the proper temperature under a definite pressure and for a time of contact adapted to produce the desired result. The catalyst chamber may be heated exteriorly, if desired, to maintain the proper reaction temperature. Also, steam may be mixed with the vaporized hydrocarbon before contacting the latter with the isomerization catalyst. Operating conditions for effecting the desired isomerization comprise a temperature in the approximate range of 200–450° C., a liquid space velocity of 0.5–20, and a pressure which may vary from substantially atmospheric to approximately 10 atmospheres. After this treatment the liquid products are separated from gases which may be formed simultaneously and the liquids are fractionally distilled to remove and recover the isomeric cyclopentene derivatives from the generally higher boiling unconverted cyclohexene, which may be recycled to further contact with the isomerization catalyst to produce further quantities of alkyl cyclopentenes.

The following numerical data are introduced to indicate typical results obtainable in producing alkyl cyclopentenes from cyclohexenes by the present process, although it is not intended to limit the scope of the invention in strict accordance therewith:

A catalyst having the approximate molecular composition of $100SiO_2:5Al_2O_3:0.5ThO_2$ was prepared by suspending a highly purified, substantially alkali-free silica gel in a solution of aluminum and thorium salts, and precipitating aluminum and thorium hydroxides in the presence of the silica gel by the addition of ammonia. The resulting mixture was filtered to remove the aqueous solution; the filter cake was dried at about 300° F.; the dried material was formed into 6–10 mesh particles by pressing, crushing, and screening; and finally calcined at 500° C. for two hours.

Redistilled cyclohexene was passed over this catalyst at 250, 300 and 400° C. using a feed rate corresponding to a liquid space velocity of 4. The results obtained are indicated in the following table:

|  | Temperature, ° C. | | |
| --- | --- | --- | --- |
|  | 250 | 300 | 400 |
| Products, wt. % of charge: |  |  |  |
| Aliphatic $C_3$ and $C_5$ | 0.0 | 0.0 | 3.5 |
| Methylcyclopentane | 1.5 | 2.8 | 26.3 |
| Methylcyclopentenes | 15.6 | 28.8 | 23.5 |
| Benzene | Trace | 1.5 | 0.0 |
| Cyclohexene | 68.2 | 55.2 | 1.5 |
| Higher boiling material | 10.0 | 11.1 | 42.2 |
| Gas | 0.0 | 0.02 | 2.4 |
| Analysis, vol. %: |  |  |  |
| Hydrogen |  | 18 | 22.4 |
| Methane |  | 48 | 7.3 |
| Ethylene |  | 26 | 6.9 |
| Ethane |  | 8 | 6.0 |
| Propene |  |  | 22.5 |
| Propane |  |  | 4.9 |
| Isobutene |  |  | 5.1 |
| n-Butenes |  |  | 7.5 |
| Butane |  |  | 17.4 |
| Loss | 4.6 | 1.0 | 0.5 |

The results in the above table show that recycling of the cyclohexene which remained unconverted at 300° C. would produce an ultimate methylcyclopentene yield of 64% based upon the cyclohexene originally charged. Use of a temperature in the order of 400° C. resulted in a small amount of ring cleavage; also in the formation of methylcyclopentane as well as of higher boiling materials containing saturated hydrocarbons and appreciable amounts of polycyclic aromatic hydrocarbons, such as dimethylnaphthalenes.

The character of the process of the present invention and particularly its commercial value are evident from the preceding specification and limited numerical data presented, although neither section is intended to be unduly limiting in its generally broad scope.

We claim as our invention:

1. A process for the treatment of cyclohexene to produce isomeric methylcyclopentenes therefrom which comprises contacting said cyclohexene at a temperature in the approximate range of 200–450° C. under a pressure of the approximate order of 1–10 atmospheres with a calcined mixture of the hydrogels of silica and alumina, using a liquid space velocity in the approximate range of 0.5-20.

2. A process for the treatment of alkyl cyclohexenes to produce isomeric alkyl cyclopentenes therefrom which comprises contacting said alkyl cyclohexenes at a temperature in the approximate range of 200-450° C. under substantially atmospheric pressure with a synthetically prepared composite of silica and alumina, using a liquid space velocity in the approximate range of 0.5-20.

3. A process for the treatment of alkyl cyclohexenes to produce isomeric alkyl cyclopentenes therefrom which comprises contacting said alkyl cyclohexenes at a temperature in the approximate range of 200-450° C. with catalytic material comprising essentially synthetically prepared silica and alumina composited with zirconia.

4. A process for the treatment of alkyl cyclohexenes to produce isomeric alkyl cyclopentenes therefrom which comprises contacting said alkyl cyclohexenes at a temperature in the approximate range of 200-450° C. under substantially atmospheric pressure with catalytic material comprising essentially synthetically prepared silica composited with alumina and zirconia, using a liquid space velocity in the approximate range of 0.5-20.

5. A process for the treatment of alkyl cyclohexenes to produce isomeric alkyl cyclopentenes therefrom which comprises contacting said alkyl cyclohexenes at a temperature in the approximate range of 200-450° C. under substantially atmospheric pressure with catalytic material comprising essentially synthetically prepared silica composited with alumina, using a liquid space velocity in the approximate range of 0.5-20.

6. A process for the treatment of cyclohexene to produce isomeric methylcyclopentenes therefrom which comprises contacting said cyclohexene at a temperature in the approximate range of 200-450° C. under substantially atmospheric pressure with a calcined mixture of silica hydrogel and a hydrogel of alumina, using a liquid space velocity in the approximate range of 0.5-20.

7. A process for producing 5-membered ring cyclo-olefins which comprises isomerizing a 6-membered ring cyclo-olefin in the presence of a calcined mixture comprising the hydrogels of silica, alumina and zirconia.

8. A process for producing 5-membered ring cyclo-olefins which comprises isomerizing a 6-membered ring cyclo-olefin in the presence of a calcined mixture comprising the hydrogels of silica and alumina.

9. A process for producing 5-membered ring cyclo-olefins which comprises isomerizing a 6-membered ring cyclo-olefin in the presence of a calcined mixture comprising the hydrogels of silica and zirconia.

10. A process for producing 5-membered ring cyclo-olefins which comprises isomerizing a 6-membered ring cyclo-olefin by contacting the same at a temperature in the approximate range of 200-450° C. with a calcined mixture comprising the hydrogels of silica, alumina and zirconia.

11. A process for producing 5-membered ring cyclo-olefins which comprises isomerizing a 6-membered ring cyclo-olefin by contacting the same at a temperature in the approximate range of 200-450° C. with a calcined mixture comprising the hydrogels of silica and alumina.

12. A process for producing 5-membered ring cyclo-olefins which comprises isomerizing a 6-membered ring cyclo-olefin by contacting the same at a temperature in the approximate range of 200-450° C. with a calcined mixture comprising the hydrogels of silica and zirconia.

13. A process for producing 5-membered ring cyclo-olefins which comprises isomerizing a 6-membered ring cyclo-olefin in the presence of a calcined mixture comprising the hydrogels of silica, alumina and thoria.

14. A process for producing 5-membered ring cyclo-olefins which comprises isomerizing a 6-membered ring cyclo-olefin by contacting the same at a temperature in the approximate range of 200-450° C. with a calcined mixture comprising the hydrogels of silica, alumina and thoria.

CHARLES L. THOMAS.
HERMAN S. BLOCH.